Nov. 6, 1951  F. WARBURTON  2,574,362
TELEGRAPH TRANSMITTER WITH MESSAGE NUMBERING
Filed March 14, 1949  16 Sheets-Sheet 1
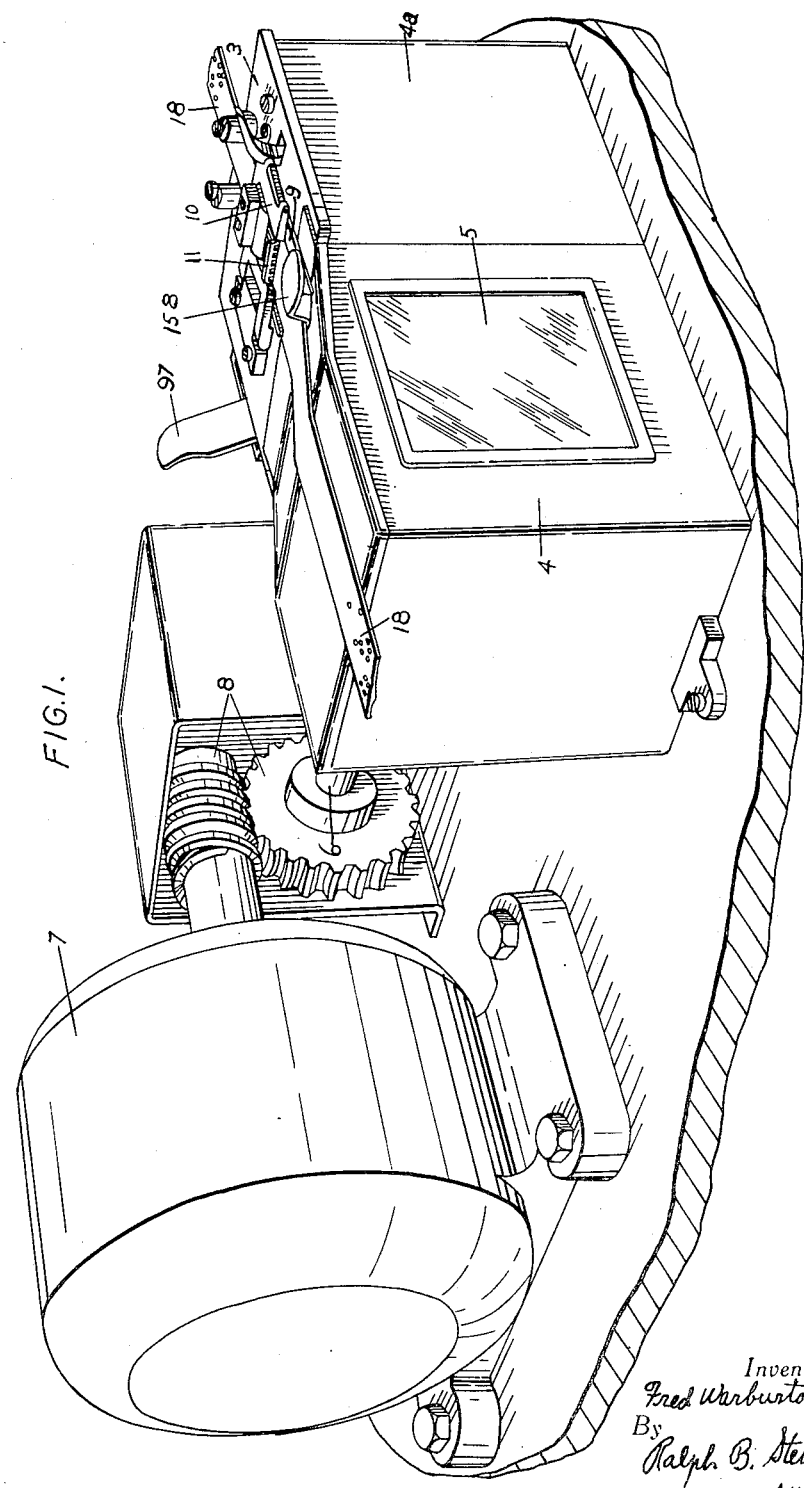

Nov. 6, 1951  F. WARBURTON  2,574,362
TELEGRAPH TRANSMITTER WITH MESSAGE NUMBERING
Filed March 14, 1949  16 Sheets-Sheet 2
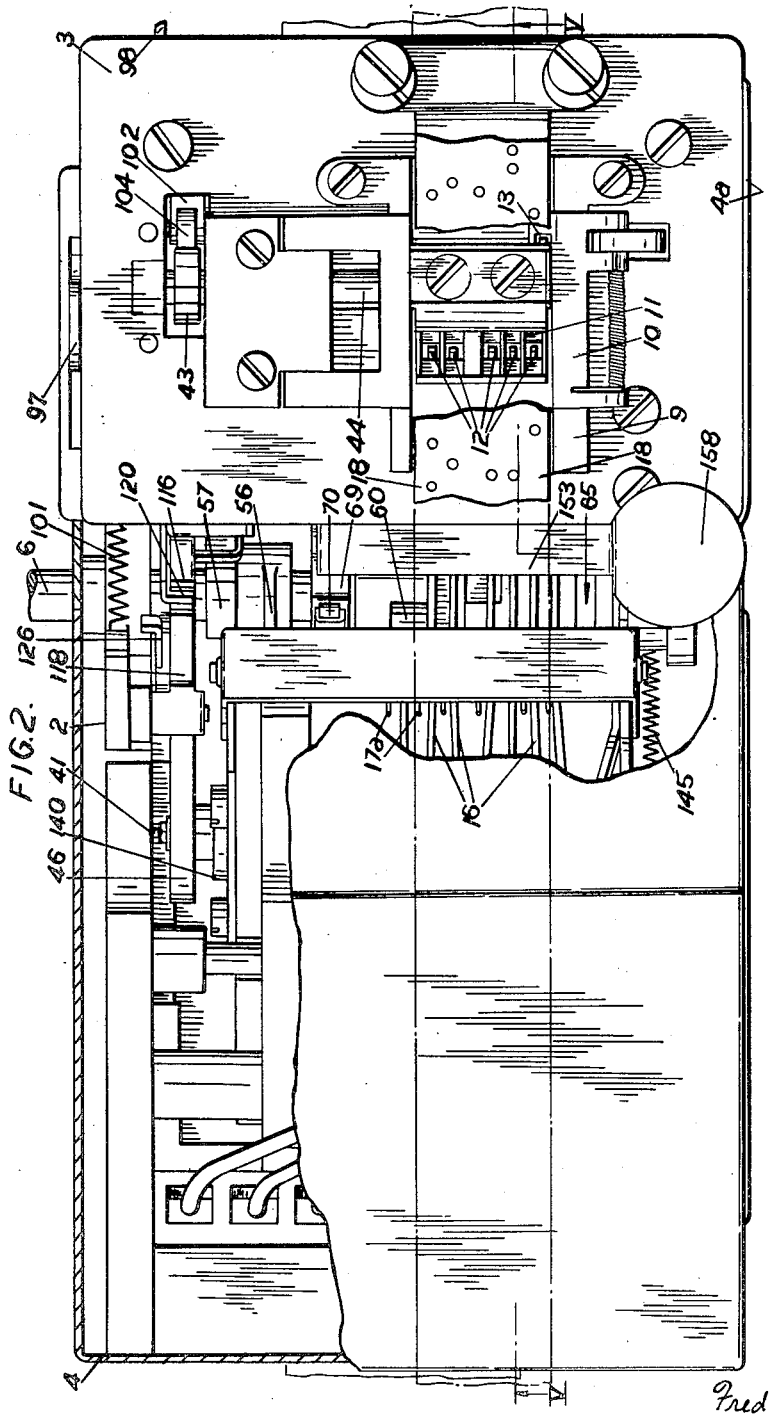
Inventor
Fred Warburton
By
Ralph B. Stewart
Attorney

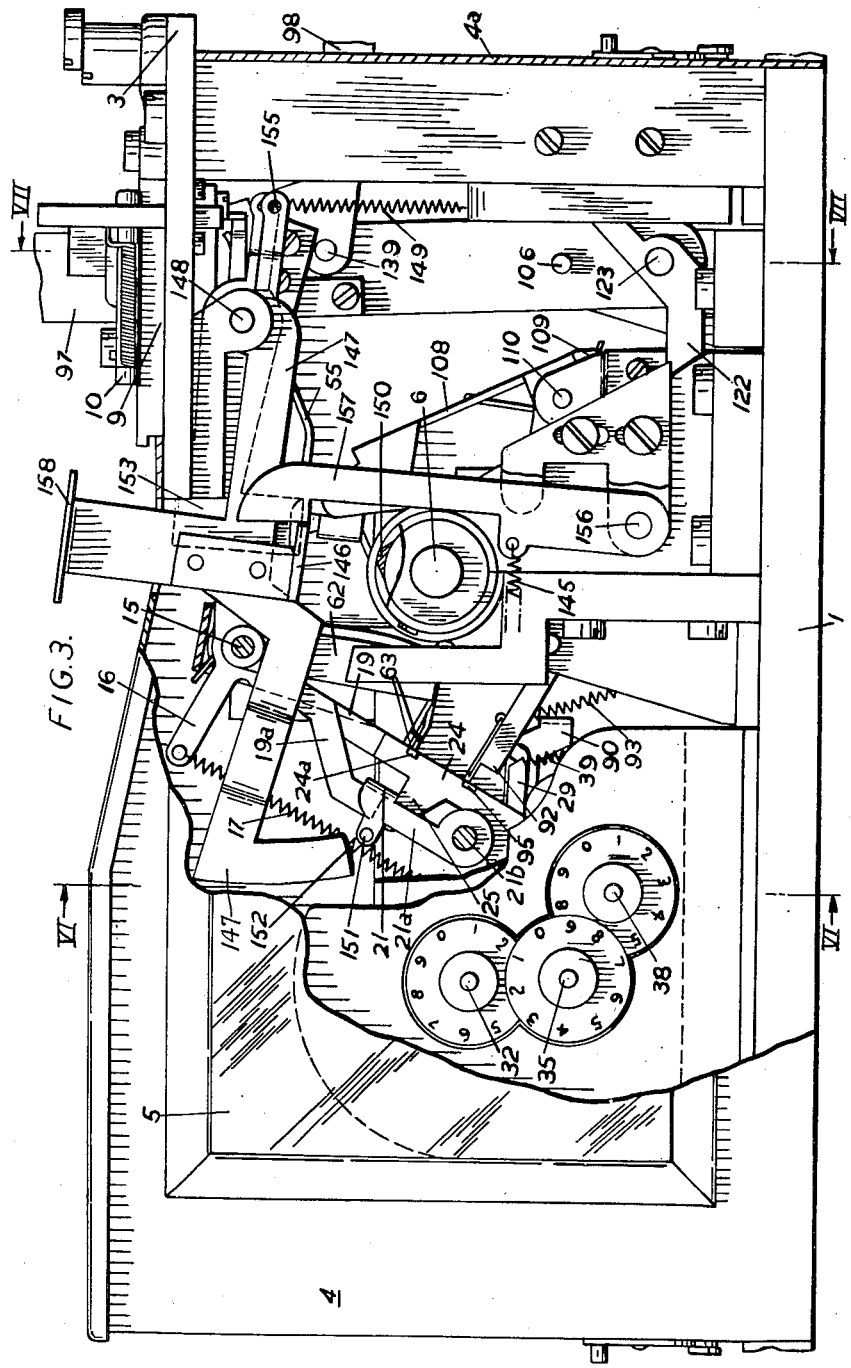

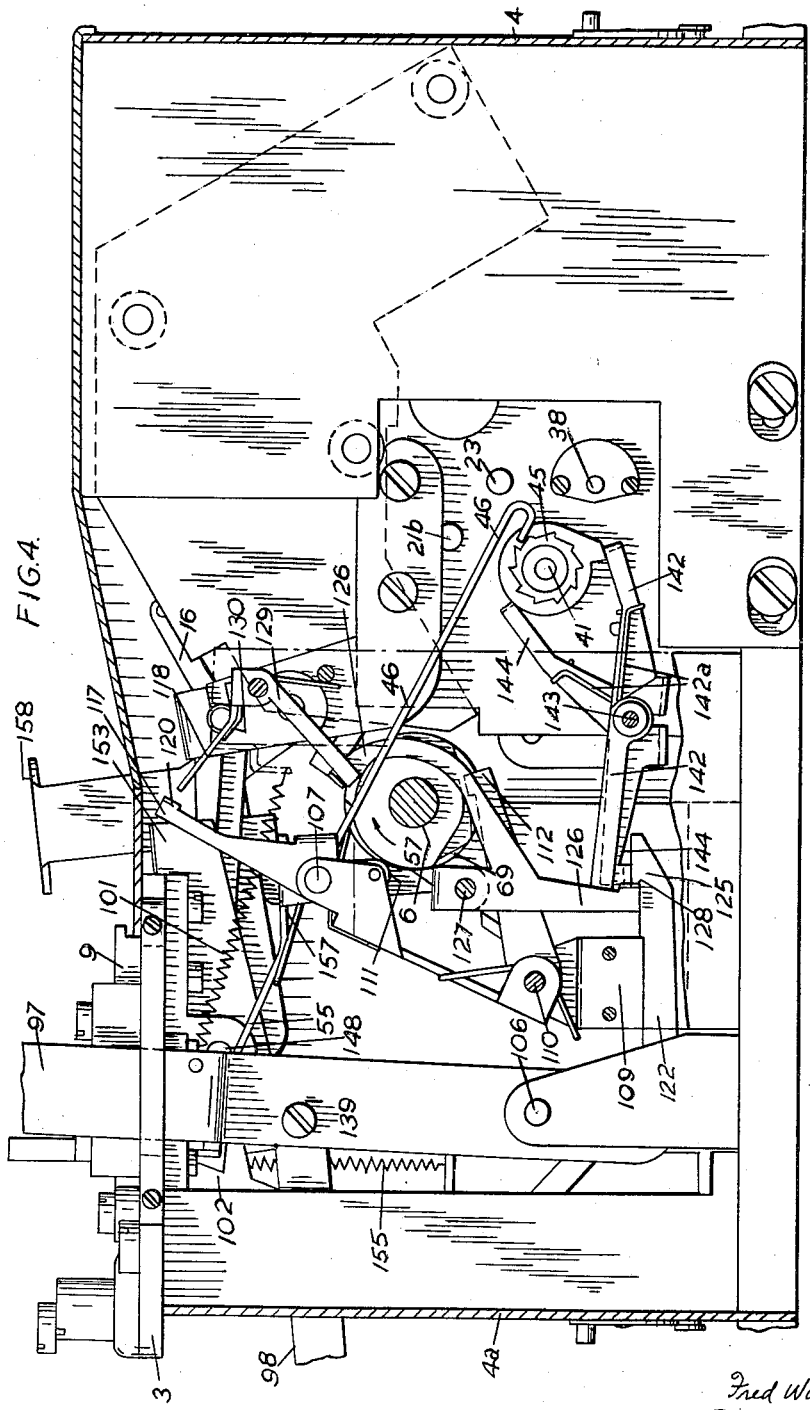

Nov. 6, 1951        F. WARBURTON        2,574,362
TELEGRAPH TRANSMITTER WITH MESSAGE NUMBERING
Filed March 14, 1949        16 Sheets-Sheet 5
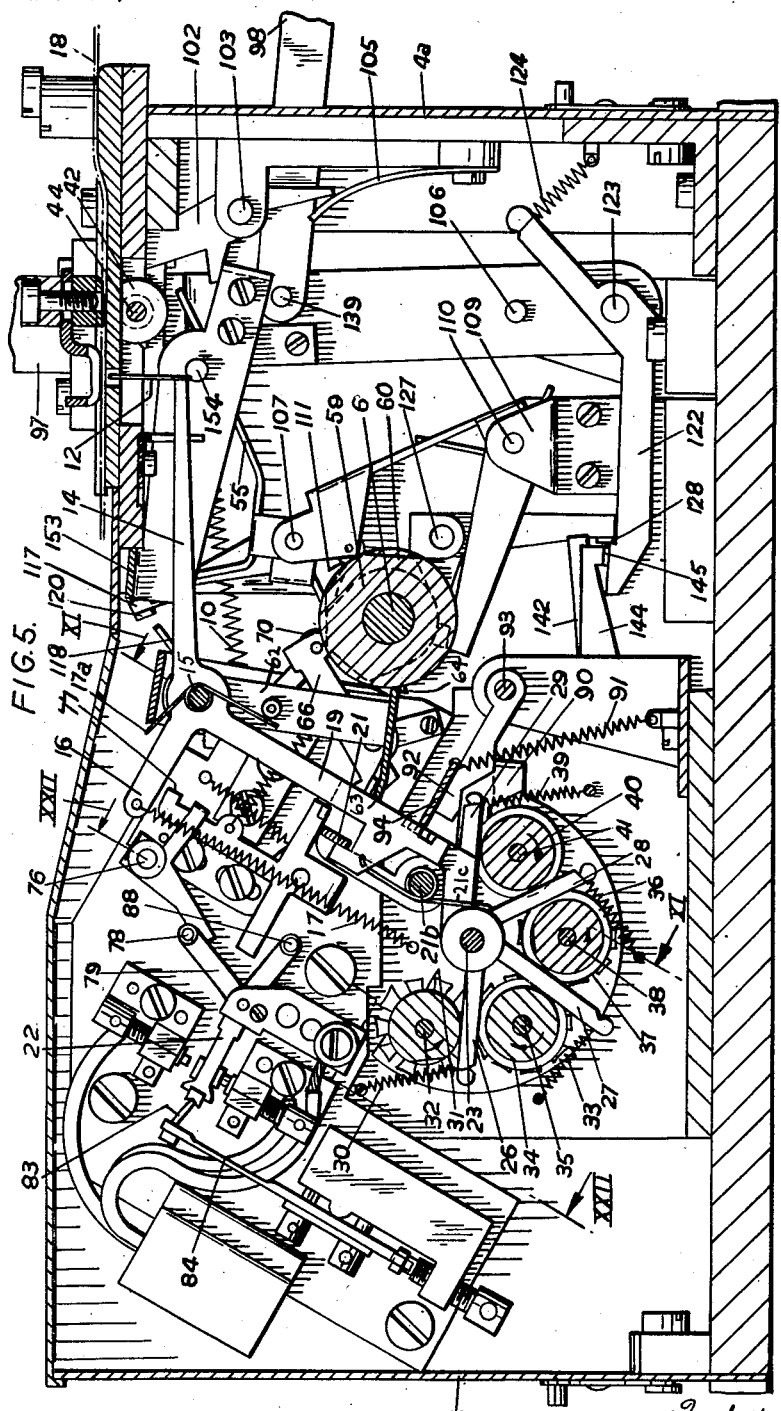
*Inventor*
*Fred Warburton*
By
*Attorney*

Nov. 6, 1951  F. WARBURTON  2,574,362
TELEGRAPH TRANSMITTER WITH MESSAGE NUMBERING
Filed March 14, 1949  16 Sheets-Sheet 6
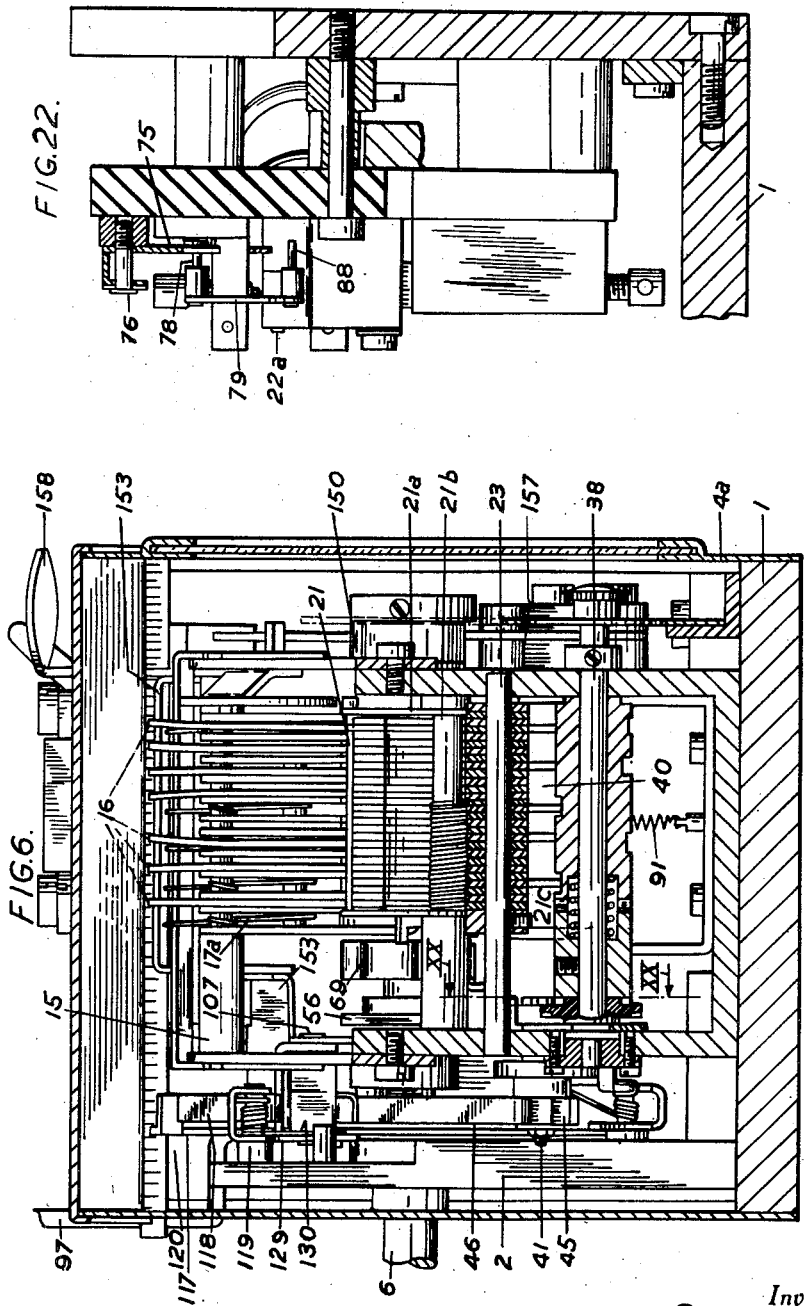
Inventor
Fred Warburton
By
Ralph B. Stewart
Attorney

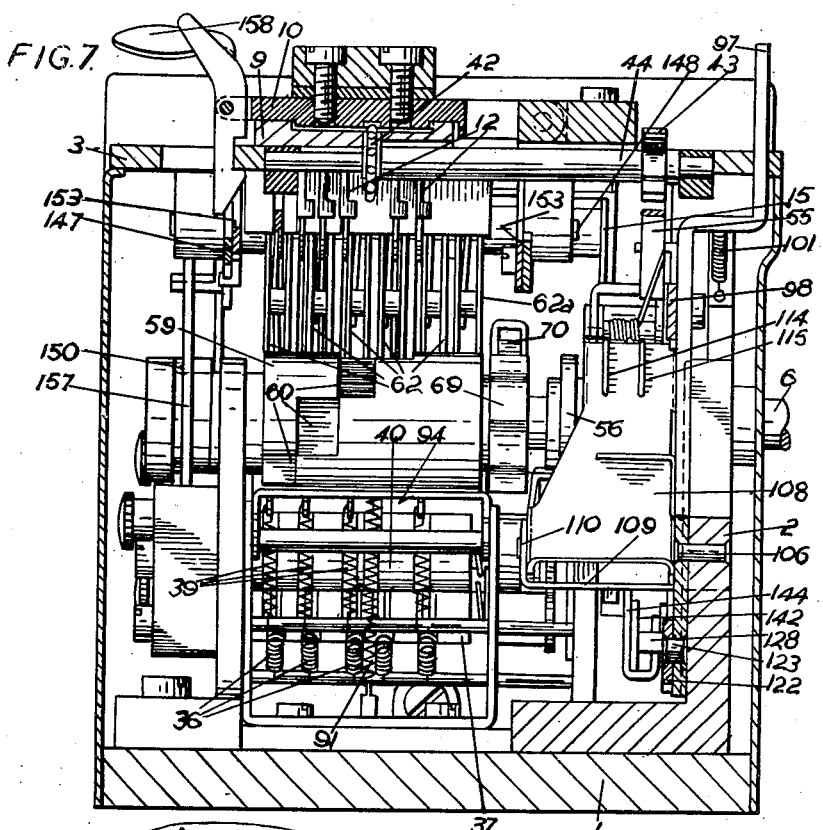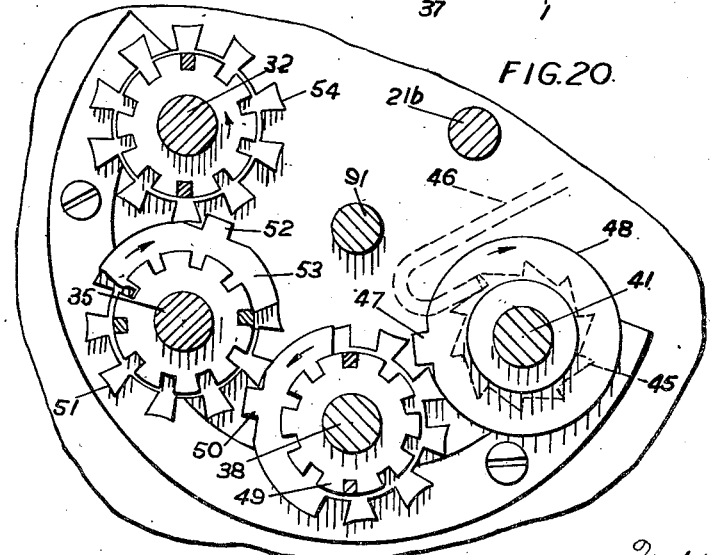

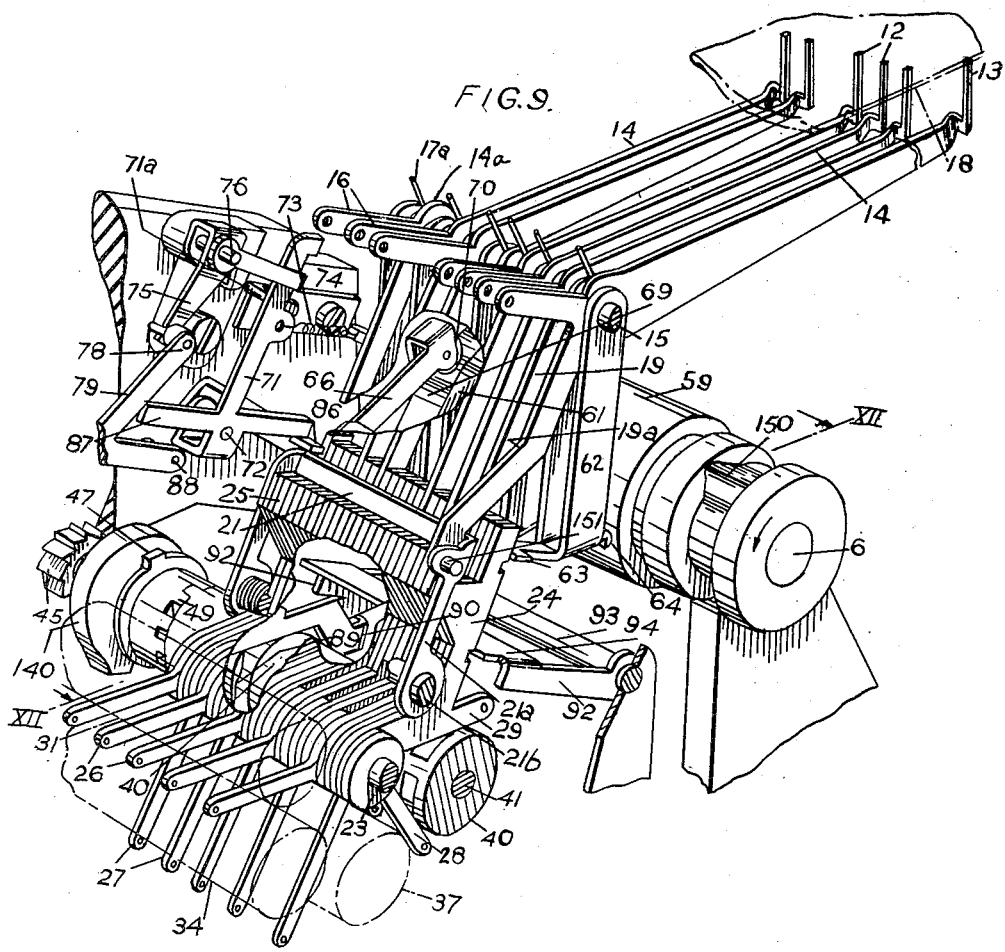

Nov. 6, 1951  F. WARBURTON  2,574,362
TELEGRAPH TRANSMITTER WITH MESSAGE NUMBERING
Filed March 14, 1949  16 Sheets-Sheet 9
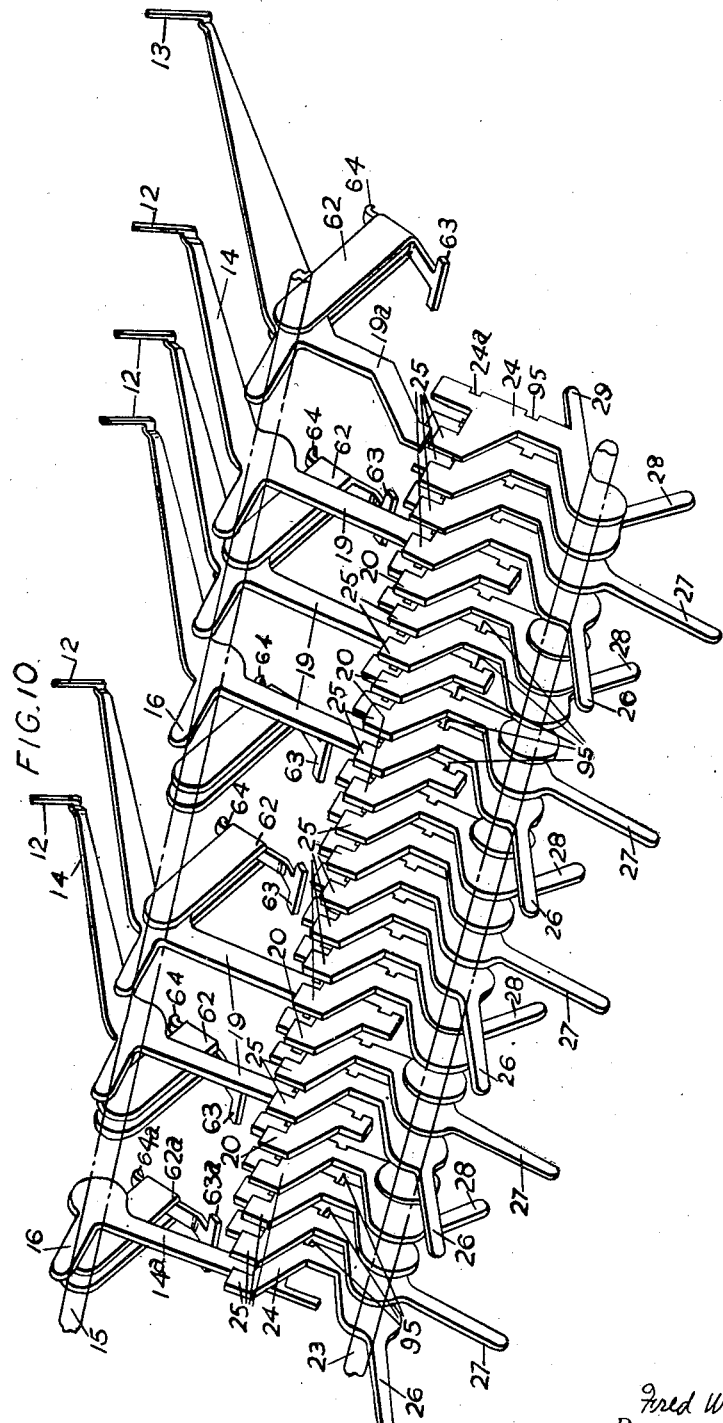

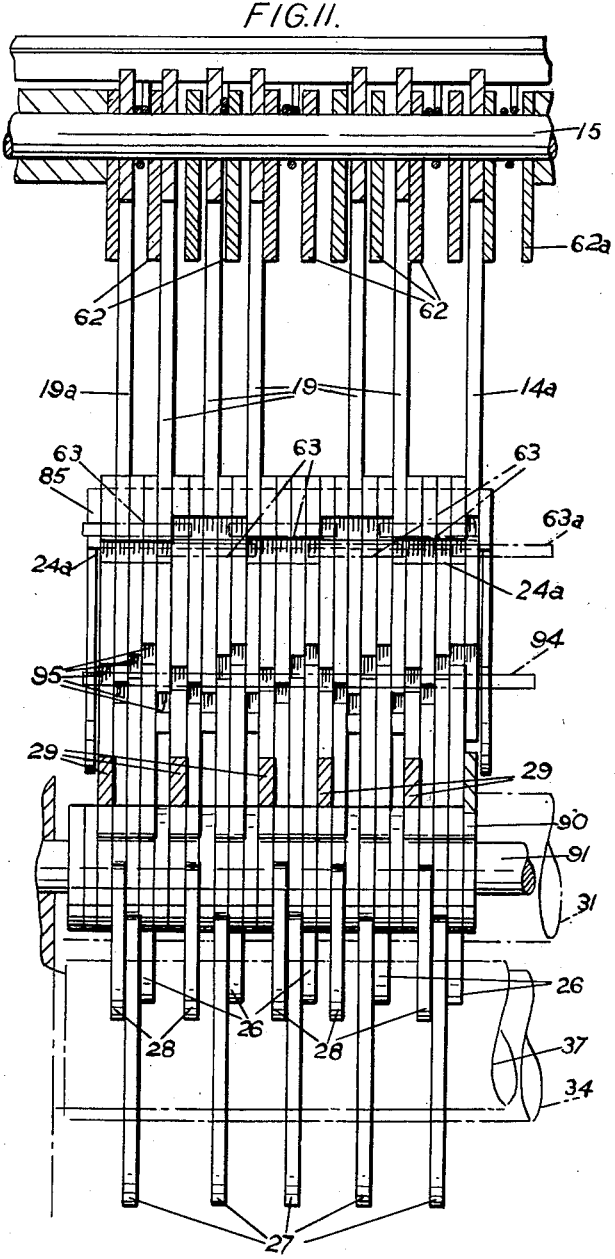

Inventor
Fred Warburton
By
Ralph B. Stewart
Attorney

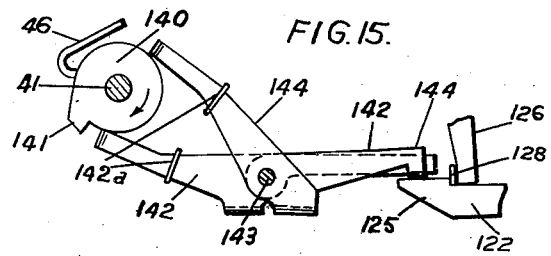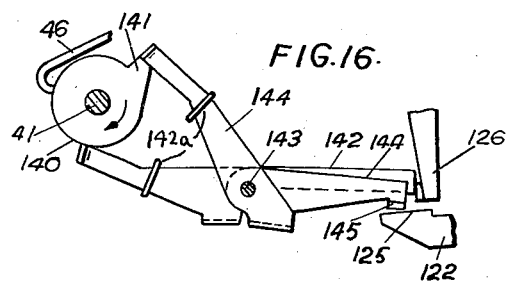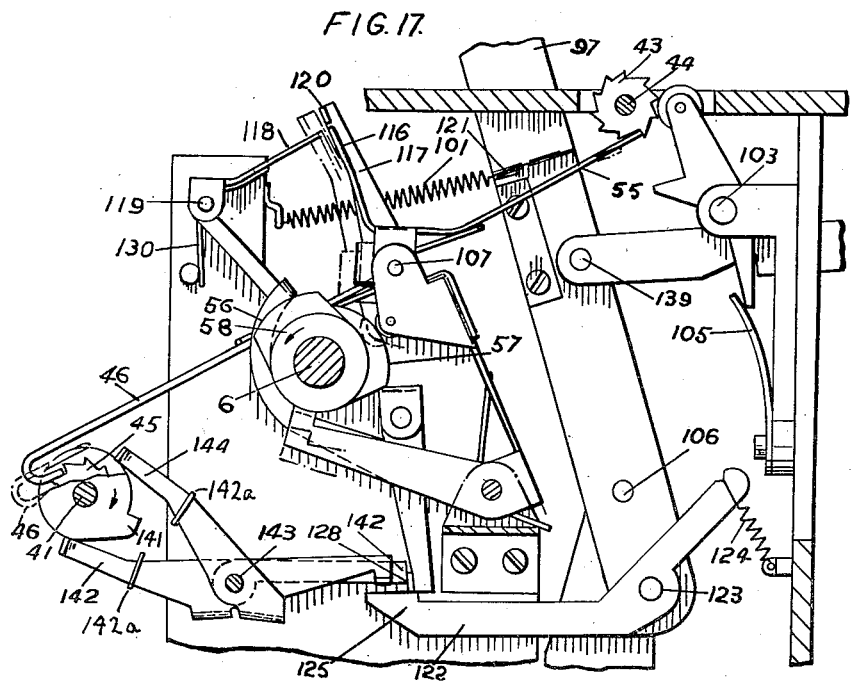

Nov. 6, 1951     F. WARBURTON     2,574,362
TELEGRAPH TRANSMITTER WITH MESSAGE NUMBERING
Filed March 14, 1949     16 Sheets-Sheet 13
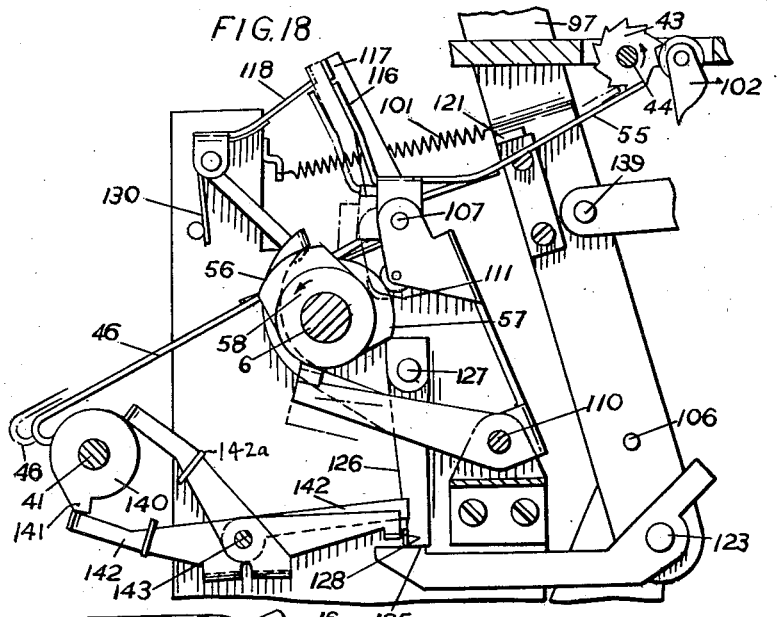
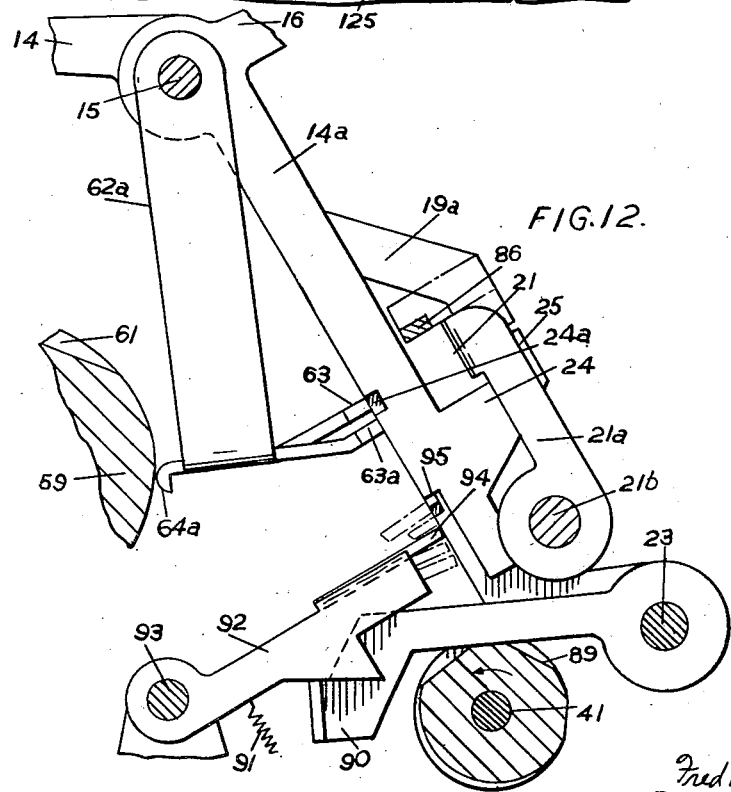
Inventor
Fred Warburton
By
Ralph B. Stewart
Attorney Nov. 6, 1951     F. WARBURTON     2,574,362

TELEGRAPH TRANSMITTER WITH MESSAGE NUMBERING

Filed March 14, 1949     16 Sheets-Sheet 14

Inventor
Fred Warburton
By
Ralph B. Stewart
Attorney

Nov. 6, 1951  F. WARBURTON  2,574,362
TELEGRAPH TRANSMITTER WITH MESSAGE NUMBERING
Filed March 14, 1949  16 Sheets-Sheet 15
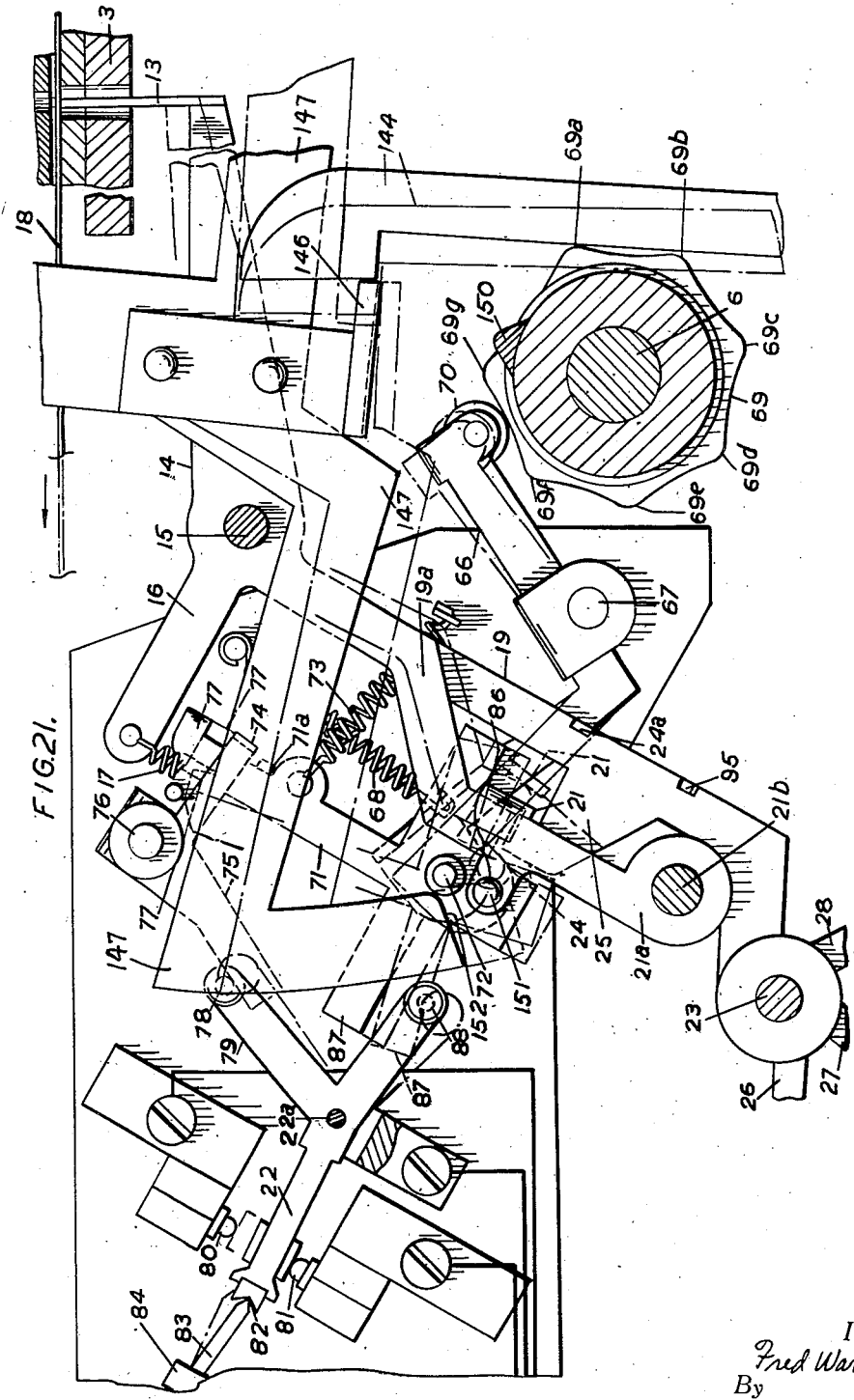
Inventor
Fred Warburton
By
Ralph B. Stewart
Attorney Nov. 6, 1951  F. WARBURTON  2,574,362
TELEGRAPH TRANSMITTER WITH MESSAGE NUMBERING
Filed March 14, 1949  16 Sheets-Sheet 16

Inventor
Fred Warburton
By
Ralph B. Stewart
Attorney

Patented Nov. 6, 1951

2,574,362

UNITED STATES PATENT OFFICE 2,574,362

TELEGRAPH TRANSMITTER WITH MESSAGE NUMBERING

Fred Warburton, London, England, assignor to Cable and Wireless Limited, London, England, a company of Great Britain Application March 14, 1949, Serial No. 81,348
In Great Britain March 22, 1948

21 Claims. (Cl. 178—17)

1

This invention relates to telegraph transmitters and particularly to transmitters for sending identifying numbers of messages in the 5-unit code. At the present time, the sending of a message is preceded by sending the number of that message. Modern requirements for relaying telegraph signals and switching them from one line to another or from one system to another; for example, in changing over from line transmission to radio transmitter or vice-versa, have given rise to extensive use of paper tape for translation but it is necessary to renumber the messages before they are retransmitted from the paper tape. The numbers then given are usually consecutive numbers for a given transmitting instrument preceded by a combination of letters which serves to distinguish the particular instrument.

The method usually adopted now is to arrange a number of transmitters in a group, one being fed with an endless paper tape perforated with serial numbers and automatically switched into circuit before any particular transmitter of the group sends out its traffic signals. In this manner, a new number is added to the beginning of the message.

The object of the present invention, in the main, is to enable a particular telegraph transmitter to transmit its own message numbers by means of a numbering device embodied in the transmitter and utilising simple and compact mechanism for that purpose.

According to the present invention, a transmitter is arranged so that on inserting paper tape with a message into the instrument and starting the transmitter, the transmitting contacts are operated by the numbering device to send out the number allotted to the message and when that has been effected, then and only then, is the feed of the paper tape bearing the traffic signals started and the starting is effected under control of the numbering device. The latter is arranged to transmit the characters forming the number and usually the distinguishing number of a message will commence with a preamble of letters belonging to the particular transmitter and then the serial number follows extending, for example, from zero to 1000. Clearly in order that the message number may be received and recorded or printed at the receiving station, it will usually be necessary to transmit after the initial letters, the figure case signal and similarly, after the serial number has been transmitted the printer has to be shifted back, for which reason the letter case signal has to be transmitted. Finally, the numbering device has to provide for changing over to enable the peckers co-operating with the paper tape to control the transmitted signals as the feed of the paper tape commences.

A simple form of numbering device is provided incorporating a spindle driven step-by-step and bearing a control cam. This control cam as it moves through the first steps, for example, the first four or more steps, possibly involving up to 20 characters, is arranged to render operative signal levers which co-operate with permutations formed on a drum fixed to the control cam spindle. Those permutations thus correspond to the letters which form the first part of the message number and the figure case signal. In the next position the control cam renders operative a set of signal levers which will send the first digit of the message number; for example, the hundreds digit; in the following position the control cam renders operative a set of signal levers which send the next digit; for example, the tens digit of the message number and, in the next position, the control cam renders operative a set of signal levers which send the units digit; it then sends the letter-case signal and finally, the control cam renders operative the signal levers controlled by peckers co-operating with the paper tape. The signal levers for each of the digits of the message number co-operate conveniently with drums which are formed with the permutations of the different number signals, and these drums are fixed to spindles which are driven by transfer mechanism from the spindle of the control cam. This mechanism is conveniently in the form of a Geneva stop mechanism arranged so that the units spindle is turned through one step at each complete operation of the control cam; the tens spindle is turned through one step at each complete revolution of the units spindle and the hundreds spindle is turned through one step at each complete revolution of the tens spindle. Thus, as each message is transmitted, the numbering device is advanced by one unit.

All the signal levers co-operate with a drum cam on a signalling cam shaft continuously driven by an electric motor and making one revolution per character. Thus, although each signal combination is ready to be set up as determined by the perforations in the paper tape or the permutations formed on the control cam spindle or the number cams, each signal lever of a group in operation only becomes effective as the continuously driven cam rotates. To make that possible, the faces of that cam are formed in helical fashion along its length so that the five signal levers of a set select marking or spacing signals in succession. All of the signal or selector levers operate the same transmitting contacts or other transmitting devices and a contact mechanism of known construction may be employed. In that case, a slide or bail continuously reciprocated at baud speed is moved to co-operate with the levers and actuates the transmitting contact to the "mark" side, if one of the levers interposes a projection or snug into the path of the said slide or bail and to the "space" side if no such projection is interposed. The selector levers may be arranged, however, to control other kinds of transmitting devices; thus a beam of light may be directed on one of a pair of photo-cells depending whether a "mark" or "space" is to be sent and the photo-electric currents amplified to operate a conventional keying circuit so that the signals are sent to line or over a radio channel. The beam of light may then be passed through an aperture in a light metal plate kept in contact with the selector levers so that the light is directed to one or other of the photo-cells. In order to provide further control over the beam of light, the signalling cam shaft has fixed to it a disc formed with two rings of apertures, seven in each ring and spaced uniformly around the disc to register with the aperture in the metal plate when the latter is in the "marking" or "spacing" position during each selection period. The seven pairs of apertures represent the start signal, the five elements of the selection and the stop signal. The disc is angularly adjusted and timed to enable its apertures to register with the aperture in the plate at the centre of the respective selection periods. The usual arrangements for focussing the light are used with the result that each photo-cell is illuminated for a short period but sufficient to enable it to change the potential of the amplifying valve, to cut off the latter or render it conducting.

An important feature of the invention consists of mechanism operated manually so that the instrument can be set in an "off" position in which neither the paper tape feed nor the control cam is operated, or in a "send" position, whereupon the control cam is immediately driven step-by-step until when it has completed the sending of the message number automatically, it comes to rest in the zero position and then the signal levers controlled by the peckers are rendered operative, and the drive for the paper tape is brought into operation. The paper tape and the control cam may be driven through ratchet wheels, the driving pawls of which are rendered operative or inoperative under conditions just described.

In order that the invention may be clearly understood and readily carried into effect, an embodiment of the improved transmitter will now be more fully described with reference to the accompanying drawings, in which:

Figure 1 is a perspective view of the complete transmitter with its driving motor and gearing;

Figure 2 is a plan of the transmitter with part of the sheet metal casing broken away;

Figure 3 is a side elevation of the transmitter seen from the bottom of Figure 2 and with part of the wall of the casing broken away;

Figure 4 is a side elevation seen from the top of Figure 2, with the casing in section.

Figure 5 is a longitudinal vertical section taken on the line V—V in Figure 2;

Figure 6 is a transverse vertical section taken on the line VI—VI in Figure 3;

Figure 7 is a further transverse vertical section taken on the line VII—VII in Figure 3;

Figure 13:
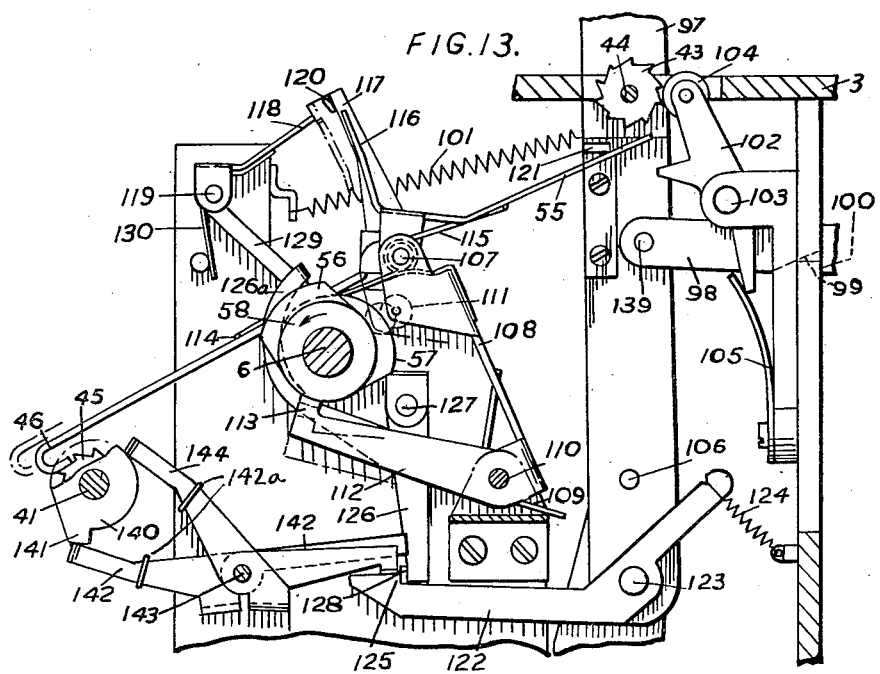
Figure 14:
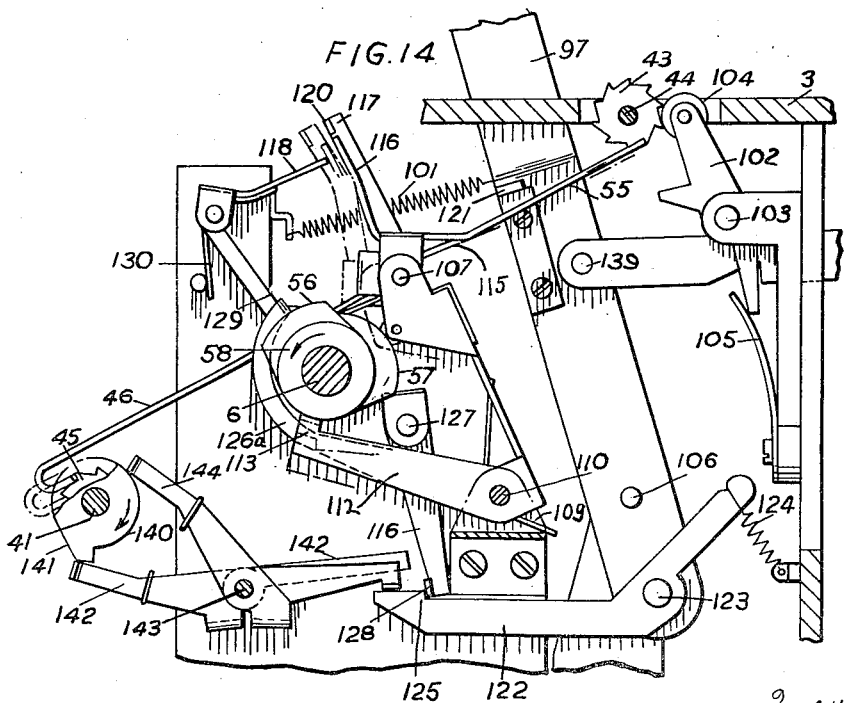
Figure 19:
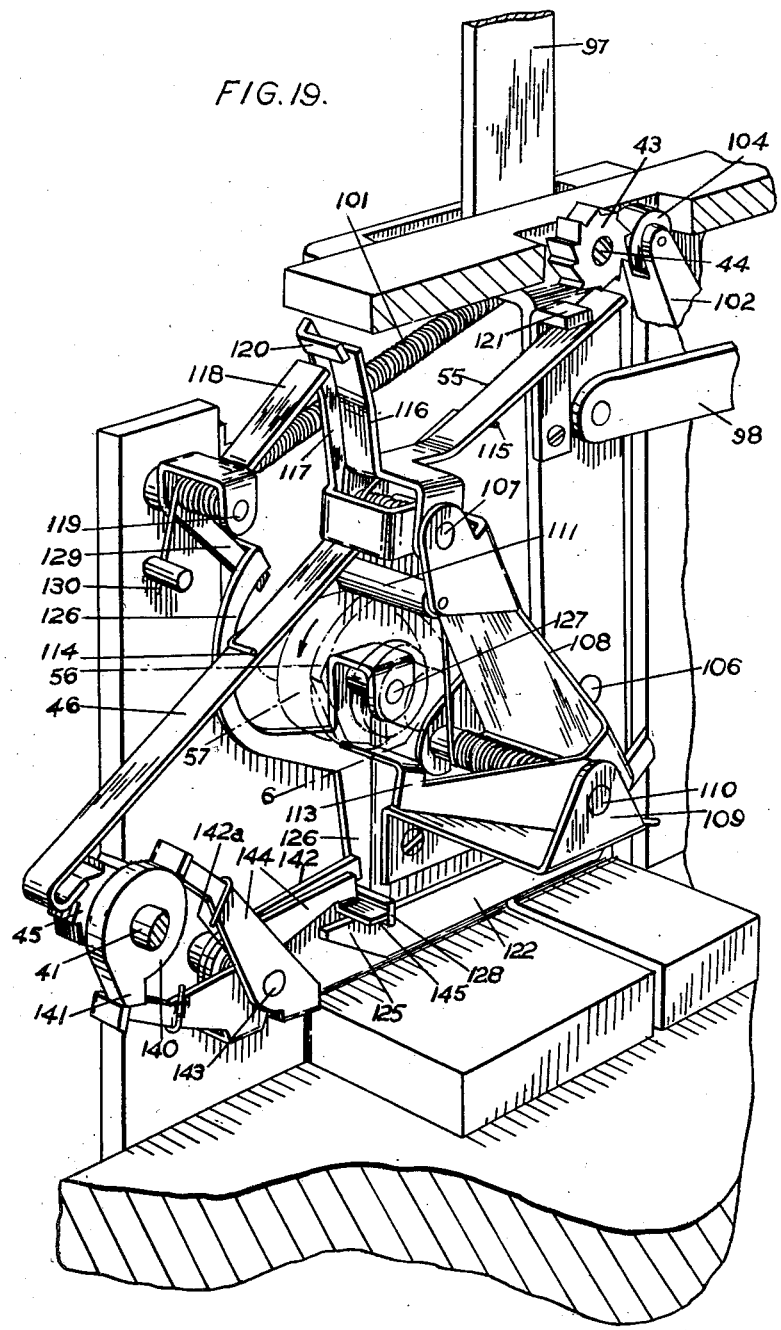
Figure 23:
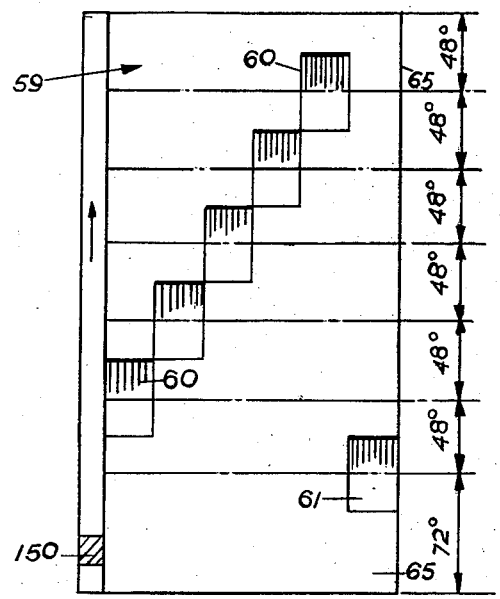
Figure 8:
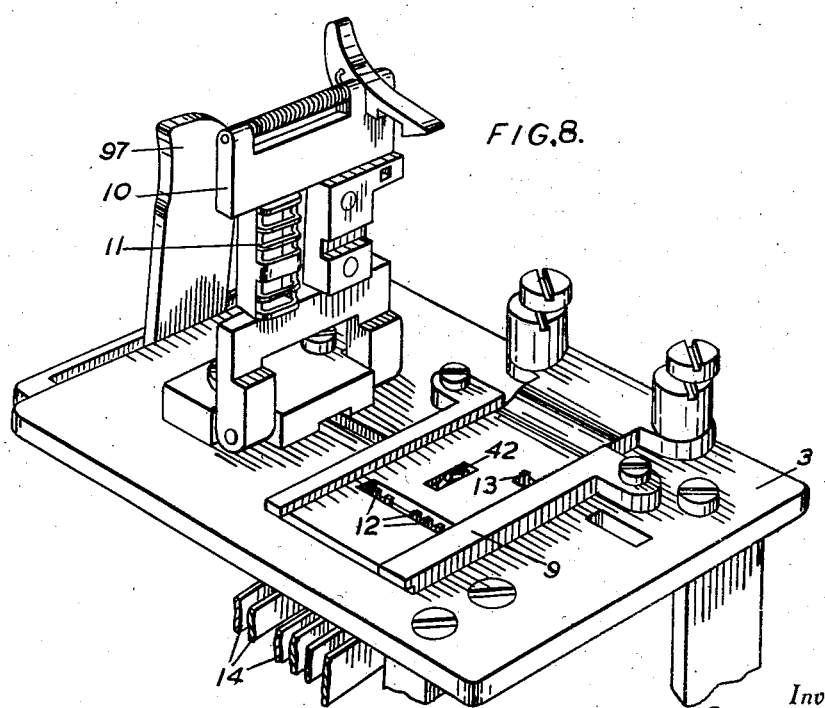

Figure 8 (shown on the same sheet with Figure 23) is a perspective view of the top of the table with the paper tape gate raised;

Figure 9 is a perspective view of a part of the mechanism showing the peckers, selector levers and the cam shafts;

Figure 10 is an exploded perspective view showing the peckers and the selector levers;

Figure 11 is an enlarged sectional elevation on the line XI—XI in Fig. 5, showing the selector levers with their pivots and associated parts;

Figure 12 (shown on one sheet with Figure 18) is a detailed vertical section on the line XII—XII in Fig. 9;

Figure 13 is a detailed elevation seen from the bottom of Fig. 2, showing the signalling cam shaft and the driving pawl mechanism with the finger lever in the "off" position;

Figure 14 is a similar view with the finger lever in the "send" position;

Figures 15 and 16 are detailed elevations showing the control cam shaft and associated levers in different positions from Figs. 13 and 14;

Figure 17 is a view similar to Fig. 14, but with the control cam shaft in a different position;

Figure 18 is a view similar to Fig. 17 in yet another position;

Figure 19 is a perspective view showing details of the driving pawl mechanism in the same position as in Fig. 13;

Figure 20 (shown on one sheet with Figure 7) is a detailed section on the line XX—XX in Fig. 6, showing the driving mechanism to the numeral shafts;

Figure 21 is an elevation seen from the bottom of Fig. 2 and showing the contact actuating mechanism, to an enlarged scale;

Figure 22 (shown on one sheet with Figure 6) is a vertical section on the line XXII—XXII in Fig. 5, and Figure 23 is a development of the cam on the signalling cam shaft.

Referring to the drawings and particularly Figures 1 to 8, the parts of the transmitter are assembled on a base plate 1 with side supports 2 surmounted by a table 3 and are enclosed in a sheet metal housing consisting of two rectangular end sections 4, 4a, which can be respectively withdrawn from the two ends.

The section 4 has a transparent window 5 through which the indicating scales on the numeral shafts, which will be referred to later, can be observed. The driven member is the signalling cam shaft 6 which is driven by an electric motor 7 through worm gearing 8 (Fig. 1).

The table 3 has, secured by screws, a paper tape guide 9 with a hinged gate 10, best seen in Fig. 8 and formed with a grille 11 for holding down the paper tape between the peckers. The signal perforations in the tape are explored in the usual way by a set of five peckers 12, most clearly seen in Figures 9 and 10, while a sixth pecker 13 is pivoted out of the line of the perforations but within the tape guide 9 so that it is normally held down by the paper tape but rises when the paper tape runs out so as to cause the stop signal to be sent continuously. Each of the peckers 12 extends upwardly from the end of a pivoted selector lever 14 which has three arms extending outwardly from the pivot 15, one carrying the pecker 12 itself, a second 16 connected to a tension spring 17 (Figs. 3 and 5) which tends to urge the pecker 12 into contact with the paper tape 18 and a third arm 19 which bears projections 20 co-operating with a slide or bail 21 which operates the transmitting contact member 22 (Fig. 21). The bail 21 consists of a cross-bar supported on end arms 21a pivoted on a spindle 21b and the bail is urged against the projections 20 of the selector levers 19 by a spring 21c (Fig. 5) coiled around the pivot spindle 21b. There is a sixth selector lever 14a (Fig. 10) which has no pecker or pecker arm, but which is mounted to turn about the same pivot 15 and comes into operation at each revolution of the signalling cam shaft 6 for a purpose which will be explained below.

Interleaved with the arms 19 of the five selector levers are four other sets of selector levers each set containing five levers. These are seen clearly in Figs. 9 and 10. All of them are capable of turning slightly about a common pivot spindle 23 and it will be seen that all of the selector levers which turn about the spindle 23 have upwardly extending arms 24 which are formed with projections 25 similar to the projections 20 of the selector levers 19 and equally serving to co-operate with the bail 21. However, one set of five of the selector levers has rearwardly directed arms 26, another set has downwardly directed arms 27, a third set has forwardly and downwardly directed arms 28 and the fourth set has forwardly directed arms 29. As will appear later, the arms 26 are drawn upwardly by springs 30 into co-operation with a cam signalling drum 31 on the hundreds spindle 32 (Fig. 5), the arms 27 are drawn by springs 33 into co-operation with a further signalling cam drum 34 on the tens spindle 35, the arms 28 are drawn by springs 36 into co-operation with a signalling cam drum 37 on the units spindle 38 while, finally, the arms 29 are drawn by springs 39 into co-operation with a signalling cam drum 40 on the control cam shaft 41 as seen clearly in Fig. 5.

The feed of the paper tape 18 is effected by a centre-hole sprocket 42 and a ratchet wheel 43 secured to the end of the sprocket spindle 44 as clearly seen in Fig. 7. The numbering device is driven by a ratchet wheel 45 on the end of the control cam spindle 41 (Fig. 9). The ratchet wheel 45 has ten teeth in this particular example but this number varies according to different conditions and would be considerably larger in cases in which the message number has to have a long preamble. As will be seen later, the ratchet wheel 45 is turned step-by-step by a hooked pawl 46 (Fig. 4) at each revolution of the signalling cam shaft 6 and the sending of the preamble and number, in the embodiment illustrated, takes place in ten steps and requires a complete revolution of the control cam spindle 41. The latter bears a driver projection 47 on a disc 48 of a Geneva stop motion secured to the spindle 41 (Fig. 20) and the projection 47 engages a Geneva stop wheel 49 with ten slots fixed on the units spindle 38 so that the latter is turned through one tenth of a revolution at each revolution of the control cam spindle and the cam drum 37 on the spindle 38 is turned so that at the next operation, it transmits a signal of a numeral one digit higher than the preceding signal (Fig. 20). The units spindle 38 and the tens spindle 35 are connected by a similar driver projection 50 on the spindle 38 and slotted wheel 51 on the spindle 35, and again a projection 52 on a disc 53 fixed to the spindle 35 drives a ten-slotted Geneva wheel 54 secured to the hundreds spindle 32. It will be appreciated that these Geneva stop motions form an ordinary form of transfer mechanism of a numeral signalling device.

The control cam pawl 46 and a straight pawl 55 which drives the paper ratchet wheel 43 are actuated by two cams 56, 57 secured to the signalling cam shaft 6 which rotates counter-clockwise as shown by the arrow 58 in Figures 13, 14, and 17 and the pawls 46, 55 operate in the manner to be described later. The signalling cam shaft 6 has six cam faces formed on it in helical fashion along the length of a drum 59 secured to it. This cam formation can be seen in Fig. 7 but for the sake of clarity, it is shown developed in Figure 23. In that figure, the drum turns about a horizontal axis and the cam faces 60 corresponding to the five elements of a signal are shown spaced from one another by angles of 48° and the additional cam face 61 for sending the stop signal, as will be explained later, is spaced from the neighbouring cam face 60 by the same angle, leaving a residue of 72°. Between the cam face 61 and the first cam face 60 seen at the top of Fig. 23, there is a concentric high part of the cam during which the start signal in a start-stop transmitting system can be sent. The purpose of the five cam faces 60 is to permit each selecting lever of one of the sets of five in operation at any time if it is otherwise free, to explore and set up in sequence, at the correct instants, marking and spacing signals as determined by the perforations in the paper tape 18 or by the cam drums on the four spindles 32, 35, 38 and 41. The actual members engaged by the cam faces 60, 61 are five members 62 suspended on the pivot spindle 15 and formed at their lower ends with horizontal blades 63 extending to the rear and each having a nose 64 to the front which might be replaced by a roller and these noses actually engage the cam faces 60. Each of the blades 63 has a transverse length sufficient to hold up a set of five of the selecting levers 24 and 19 which are therefore pressed by their springs 17 against the blades 63 and hold the nose 64 against the cam drum on the signalling cam shaft 6. There are also auxiliary wire springs 17a acting between the selector levers 19, 24 and the members 62 to maintain constant pressure on the cam 59. Alternate blades 63 are at slightly different levels and engage in slots 24a also at corresponding heights to avoid any interference between adjacent blades during selection. Thus, as already stated, when one of the cam faces 60 arrives opposite a nose 64, any selecting lever engaging that blade 63 will, if the lever is free, press the nose 64 forward into the cam face and according to the selector lever of the set which is in action at any time and according to the signal being sent, the lower end of the lever will move forwards as permitted by the cam face. At this stage, the sixth selector lever 14a, which it will be remembered has no pecker, presses forward an additional blade 63a formed at the end of a pivoted arm 62a and its nose 64a is allowed to move forward by engagement with the cam face 61 and, as will be seen later, this establishes the marking condition which in the system employed is the stop signal. However, before the five signalling elements are transmitted, a start signal is sent by the high part 65 of the cam as seen in Fig. 23, this signal being represented by a spacing condition in which all selector levers are held in the rearward position and then the contact actuator to be described later, places the contact lever 22 on to the spacing side and therefore sends the start signal to line.

The operation of the contact lever 22 is as follows and can be best appreciated from a study of Fig. 21. A bent lever 66 pivoted at 67 is held by a tension spring 68 in contact with a 7-pointed cam 69 fixed on the signalling cam spindle 6 so that the roller 70 on the end of the lever 66 is lifted at the middle of each signal element period. The function of the high points of the cam 69 is is follows: The point 69a engages the roller 70 to produce the start signal at a point corresponding to the high portion 65 of the cam 59 in Fig. 23; the five points 69b, 69c, 69d, 69e and 69f similarly correspond to the five signal elements and the remaining point 69g corresponds to the stop signal. The angle subtended between the points 69g and 69a is extended for the additional time division for the stop signal. As a result of this, a three-armed lever 71 pivoted to the lever 66 at the point 72 is reciprocated up and down, once for every signal element period. A tension spring 73 urges the lever 71 clockwise about its pivot 72 and if the lever 71 is unimpeded, the spring 73 holds the lever 71 against fixed stop projection 71a. Then, as the lever 71 moves down, its hooked end 77 engages a turned-over part 74 on the end of one arm of a bell-crank 75 pivoted at 76, and rocks the bell-crank 75 clockwise. However, the bell-crank 75 is in a position for its left-hand arm to engage a pin 78 extending from a side arm 79 of the contact lever 22. If the contact lever 22 is resting against the upper or mark contact 80, the result of rocking the bell crank 75 is to move the arm 79 counter-clockwise and therefore to move the contact arm 22 counter-clockwise about its pivot 22a down on to the lower or space contact 81. If the contact arm 22 is already in that position, it just remains there. It will be noted that the arm 22 is notched at its left-hand end at 82 and is engaged by a blade 83 on a spring arm 84 and this provides the usual toggle or jockey action for ensuring quick change over of the contact arm 22.

When a marking element is to be sent, as will appear later, a bail 21 already referred to is moved clockwise below a forwardly extending piece 86 on the right-hand arm of the lever 71 and then, when the lever 71 is next moved downwards, the bail 21 resists the downward movement of the part 86 causing the lever 71 to swing counter-clockwise about the pivot 72. This has the effect of moving the hooked end 77 of the lever 71 to the left so that it does not engage the turned-over part 74 but in addition to this, the left-hand arm 87 of the lever 71 engages an electrically insulated pin 88 on a second rearward extension of the contact arm 22 which obviously turns the arm 22 clockwise so that it is brought into contact with the upper or mark contact 80 and send a mark to line.

At any time, only one of the five sets of selector levers 19, 24 is allowed to be operative and it is arranged that this depends upon the position of the control cam spindle 41. In fact, this is controlled by a cam 89 on the spindle 41 (Fig. 12) which is engaged by a lever 90 pivoted on the spindle 23 and which lifts a group selecting lever 92 pivoted at 93 and held down on the lever 90 by a tension spring 91. The lever 92 at its front end carries a cross-bar 94 which takes the form of a narrow plate extending completely across in front of the selector levers 19, 24. The cross-bar 94 is raised or lowered by the cam 89 and can take up any one of the five positions indicated in Fig. 12.

The selector levers 19, 24 are notched at 95 on their front edges so that under the action of their control springs, one set of five selector levers is permitted to pass forwardly by the forward edge of the cross-bar 94 and thus to become operative. When any one of the selector levers 19, 24, moves forward, the bail 21, seen in Fig. 21, moves forward below the piece 86 and, as already described, resists the downward movement of that part causing the lever 71 to move the contact arm 22 over on to the mark contact 80.

The ten positions of the control cam shaft 41 and its cam drum 40 are effective in the following way: The zero position is that shown in the drawings, for example, in Fig. 9 from which, as already stated, the cam drum 40 is moved clockwise in Fig. 9 one tenth of a revolution at each complete revolution of the signalling cam shaft 6. In the first of these positions after the zero position, the letter case signal is sent, for which purpose, recesses controlling the five selector lever arms 29 (Figs. 9 and 10) are formed in the cam drum 40 on the spindle 41. The letter case signal requires recesses at all the positions 1, 2, 3, 4 and 5 along the cam drum 40. It will be appreciated then that the cross-bar 94 is moved until it is opposite the notches in all five of the selector levers 24 bearing the arms 29 so that as the signalling cam shaft 6 makes a revolution and the cam faces 60 of the cam 59 allow these five selector levers to move forward in succession, each of the arms 29 is lowered into the corresponding recess of the cam drum 40 and sends a mark signal.

In the second feed position of the cam drum 40, the first letter of the distinguishing code of the transmitter is sent by another line of permutation recesses formed on the cam drum 40 controlling the arms 29. For example, if the first letter is the letter "A," permutation recesses are required in positions 1 and 2 along the cam drum 40.

In the third feed position of the cam drum 40, the second letter of the distinguishing code of the transmitter is sent. If, for example, that is letter "B," permutation recesses are provided along the cam drum 40 in positions 1, 4 and 5.

In the fourth feed position of the cam drum 40, the third letter of the distinguishing code of the transmitter is sent by the arms 29. Thus, for example, if that letter is "C," permutation recesses are formed in positions 2, 3, and 4 along the cam drum 40.

In the fifth feed position, the figure case signal is sent which requires permutation recesses in the positions 1, 2, 4 and 5 along the cam drum 40.

It will be observed that so far, these signals have been sent through the arms 29 and therefore the cross-bar 94 is maintained by the cam 89 during this period at the level opposite the slots in the five selection levers 24 which carry the arms 29. From this point, the serial number of the message is commenced with the hundreds digit so that now, the arms 26 which co-operate with the cam drum 31 on the hundreds spindle 32 have to take charge. Therefore in the sixth feed position, the cam 89 moves the cross-bar 94 to the level of the slots in the five selector levers which bear the arms 26. The signal then sent naturally depends upon the permutation recesses along the cam drum 31 on the hundreds spindle 32 now co-operating with the five arms 26. Accordingly, the hundreds digit of the serial number of the message is sent in precisely the same way as described above for the arms 29.

In the seventh feed position, the cam 89 moves the cross-bar 94 to the level of the slots in the selector levers carrying the five arms 27 cooperating with the cam drum 34 on the tens spindle 35 so that the tens digit is then sent in a similar way to that already described for the hundreds digit.

Then in the eighth feed position, the cam 89 moves the cross-bar 94 to release the selection levers 24 carrying the five arms 28 which cooperate with the cam drum 37 on the units spindle 38 and the units digit of the serial number of the message is sent by the bars 28 in a similar way to that already described.

In the ninth feed position, the letter case signal is sent again precisely as described above for the first feed position, that is to say, that the cross-bar 94 again releases the selector levers carrying the arms 29.

Finally, in the tenth feed position, which is the same as the zero position, the cam 89 moves the cross-bar 94 to the level of the notches in the five selector levers 19 which are thus freed and are operated by the perforations in the paper tape 18 which permit the necessary peckers 12 to pass. The transmitter operates in this way and in this setting until all the traffic signals perforated on the paper tape 18 have been sent. It will be seen from Figure 12, that the cam 89 has a concentric portion which keeps the crossbar 94 at the same level for the first five of the feed positions and then is given the correct contour to move the cross-bar 94 into the other four positions.

It will be appreciated that during the sending of the letters in the distinguishing code of the transmitter, the serial number and the letter case and figure case signals, the spindle 41 has been driven step-by-step by its pawl 46 driving the ratchet wheel 45, but that when the tenth or zero feed position is reached, the pawl 46 is taken out of action and the pawl 55 brought into engagement with the paper feed ratchet 43 which it continues to rotate step-by-step while all the traffic signals of the message are being sent.

The operation is controlled by a finger lever 97 which serves to start the operation which will now be described with reference to Figures 4 and 13 to 18. The finger lever 97 is in a position which is almost vertical as shown in Figs. 5, 13 and 19 which is the "off" position when the transmitter is not being operated. In that position, the finger lever 97 engages a latch consisting of an arm 98 pivoted to it and formed with a notch 99 in its lower edge shaped to engage a catch plate 100 fixed to one of the end members of the frame of the instrument. Thus, when the finger lever 97 is moved to the "off" position, the lever 98 drops down and latches it in that position although a tension spring 101 tends to draw it into the inclined or "send" position. Incidentally, a check lever 102 pivoted to the frame at 103 carries a roller 104 which is held in engagement with the feed ratchet 43 by a flat spring 105 to hold the ratchet 43 in its set positions. The finger lever 97 is pivoted to the frame at a point 106 towards its lower end.

The paper feed pawl 55 and the control cam pawl 46 are mounted so that they can be rocked slightly about a common axis at 107 which is on a carrier lever of box formation 108 pivoted in a fixed bracket 109 at 110. This lever carries a roller 111 continuously engaged by the cam 57 fixed to the signalling cam shaft 6 while the lever 108 has another arm 112 rigidly secured to the lever 108 but turned up at 113 to engage the other cam 56 fixed to the shaft 6 so that at each revolution of the shaft 6, the pivot 107 is moved in one direction about the pivot 110 and positively returned by the cams 56 and 57. The pawl 46 has a wire spring 114 and the pawl 55 has a wire spring 115 which tend to bring the two pawls into engagement with their respective ratchet wheels 45 and 43. However, in certain stages of the operation and when the finger lever 97 is in the "off" position already referred to, the pawls 46, 55 are both pulled out of engagement with their ratchet wheels so that they reciprocate without any effect if the driving motor 7 is switched on. The paper feed pawl 55 is L-shaped with an outwardly extending arm 116 and the control cam pawl 46 also has an outwardly extending arm 117 so located that an interposed piece 118 pivoted at 119 when in the inner position as seen for example in Figs. 14 and 19, engages the arm 116 of the paper feed pawl 55 and when in its outer position, seen for example in Fig. 13, it engages a turned-in part 120 of the control cam pawl arm 117 and then holds the control pawl 46 out of action.

To start a message, the latch arm 98 is lifted and released from the catch plate 100. In the "off" position shown in Fig. 13, a projection 121 carried by the finger lever 97 bears on the top of the paper feed pawl 55 and prevents it from engaging its ratchet wheel 43 as clearly seen in Figs. 13 and 19. An arm 122 is pivoted at 123 near the lower end of the finger lever 97 and is biassed clockwise by a tension spring 124. The lever 122 has its left-hand end hooked at 125 and when the finger lever 97 is latched in the "off" position as seen in Fig. 13, the hook 125 is allowed to gather behind a pawl actuator 126 pivoted at 127 for which purpose, the actuator 126 is formed with a turned-out toe 128. The pawl actuator 126 has a rearwardly extending arm 126a which bears against the pivoted interposed piece 118 being hooked around a second arm 129 of the interposed piece 118 which is held in engagement with the actuator 126 by a wire spring 130. Under these conditions, the interposed piece is in its outer position as shown in Fig. 13 engaging the turned over part 120 of the control cam pawl 46. When the pawl 46 has been withdrawn by the cam 56 on the shaft 6, then the pawl 46 is prevented from engaging its ratchet wheel 45 until it is too late to gather a tooth, and therefore as already stated, although both pawls 46 and 55 are continuously reciprocated as the shaft 6 is rotated, no drive takes place to the paper sprocket 42 or to the control cam spindle 41.

When the latch lever 98 is lifted about its pivot 131, the spring 101 draws the finger lever 97 into the "send" position as seen in Figs. 14, 17 and 18 and the arm 122 turns the pawl actuator 126 counterclockwise into the position shown in Fig. 14 and the actuator 126, at its upper end, pulls the interposed piece 118 clockwise so that it moves to its inner position and thus engages the arm 116 of the paper feed pawl 55. This frees the arm 117 and the spring 114 turns the control cam pawl 46 to engage with the teeth of the ratchet wheel 45. The control cam spindle 41 has fixed to it a cam 140 with a projecting piece 141 which, when the spindle is in the zero position as shown in Figs. 13 and 14, engages a pivoted retaining lever 142 which, as shown in Fig. 13, is above the toe 128 of the pawl actuator 126. When the cam 140 is turned through one step as shown in Fig. 15, however, the retaining lever 142 is caused by a scissor shaped spring 142a, wound around its pivot 143 to drop behind the toe 128 of the actuator 126 and thus prevents the latter from allowing the piece 118 to release the arm 116 of the paper feed pawl 55. As the spindle 41 rotates, the part 141 of the cam 140 actuates a lever 144 also pivoted about the axle 143 and held against the cam 140 by the spring 142a, rocking the lever 144 clockwise so that its turned-out end 145 presses down the hooked end 125 of the arm 122 as shown in Fig. 16 so that this end is disengaged from the toe of the pawl actuator 126 and is moved slightly to the right in Fig. 16 by the spring 101 rocking the finger lever 97. Thus, the hooked end 125 is now below the actuator 126 which is turned slightly by its spring 130 until it engages the end of the retaining lever 142. When the spindle 41 regains its zero position, as shown in Fig. 18, the cam 140 rocks the retaining lever 142 counter-clockwise from the toe 128 of the actuator 126 which allows the interposed piece 118 to be moved by its spring 130 to engage the arm 117 of the control cam pawl 46 so that the latter is held out of engagement with the ratchet wheel 45 in the dotted position shown in Fig. 18, until a fresh piece of paper is placed in the paper guide 9 and the finger lever 97 operated again. However, when the finger lever 97 was moved into the "send" position, the projection 121 released the paper feed pawl 55 which engaged its ratchet wheel 43 so that as the pawl 55 is now reciprocated, the paper tape 18 is now fed through the transmitter.

The function of the additional pecker 13 already mentioned is to operate the mark selection by the pecker 13 rising when there is no paper tape in the transmitter and thus to send the stop signal continuously when the transmitter is idle. For that purpose, the pecker 13 has an arm 19a corresponding to the arms 19 of the other peckers but which is bent and shaped to engage over the back of the bail 21 so that when the pecker 13 is allowed to rise, its spring ensures that the bail 21 is held forward to intercept the piece 86 of the contact actuator 71 and thus sends a continuous mark which is the stop signal.

A press button 158 is provided which, when pressed down, is retained by a hooked arm 157 (Fig. 3) pivoted at 156 and drawn to the left by a spring 145 and engaging a horizontal plate 146 riveted to the bottom of the press button 158. The latter is fixed to a lever 147, pivoted at 148 and urged upwardly by a tension spring 149. The extreme end of the lever 147 (Fig. 21) is shaped as a cam 152 engaging a pin 151 forming part of the bail 21 and when the button 158 is depressed, the pin 151 is moved forwards and shifts the bail into the marking position. When the button 158 is held down, therefore, it sends continuously a marking condition or stop signal but when released, it is allowed to rise at the completion of the selection cycle by a cam 150 fixed to the signalling cam shaft 6 at approximately the same angular position as the stop cam face 61. This ensures that the stop signal will be maintained to the end of a completed cycle and therefore ensures a clean copy on the receiver.

Incidentally, the button 158 is arranged to be available when the transmitter is not in operation to free the check roller 104 from the ratchet 43 to facilitate the insertion of a fresh length of paper tape. For that purpose, when the button 158 is depressed, it engages with lost-motion, a cradle 153 pivoted at 154 and rocks the cradle so that it turns the check lever 102 and moves the roller 104 clear of the ratchet 43. On releasing the button 158, the cradle 153 is restored by a coiled tension spring 155 (Fig. 4).

It will be appreciated that the transmitter described is arranged to operate on the start-stop system and that the feeding of the paper tape takes place during the start-stop division of the cam 59 which is shown at 65 and occupies approximately 100 percent of that cam time. The invention may, however, be applied to transmitters for five unit working without start-stop with appropriate modification of the signalling cam 59.

I claim:

1. A telegraph instrument for transmitting signals recorded on perforated tape according to the 5-unit code comprising a 5-unit telegraph tape transmitter, a serial-number signal transmitting device comprising a rotary control cam shaft, a driving shaft, clutch means adapted to connect said driving shaft alternatively to said telegraph tape transmitter and to said control cam shaft, manually operated means for actuating said clutch means to couple said driving shaft to said control cam shaft and means operatively connected with said control cam shaft to be actuated on completion of a cycle of said control cam shaft to uncouple said driving shaft from said control cam shaft and to couple said driving shaft to said tape telegraph transmitter.

2. A telegraph instrument for transmitting 5-unit telegraph signals operated by perforated tape comprising a 5-unit telegraph transmitter for sending traffic signals and a 5-unit signal transmitter arranged to transmit serial numbers allotted to the transmitted messages and comprising a numbering device, means driving said numbering device through repeated cycles, the instrument being arranged so that on starting transmission, signals are transmitted by said numbering device to represent the number alloted to the respective message, tape driving means for feeding said tape, and means controlled by the numbering device for stopping the drive of the numbering device and for starting the feeding means for the tape at the completion of each cycle of the numbering device.

3. A telegraph instrument according to claim 2, in which said numbering device is operated in step-by-step fashion and arranged to send at each step, one of a series of 5-unit signals comprising signals distinctive of the transmitter followed by the digits of a serial number of the message in descending order.

4. A telegraph instrument according to claim 3, in which said numbering device is operated to send after successive steps a letter case signal, letter signals distinctive of the transmitter, a figure case signal and signals representing the digits of a serial number of the message in descending order and finally, on coming to rest, causes the 5-unit transmitter to be set in operation to send the traffic signals of the message translated from the perforated tape.

5. A telegraph instrument according to claim 2, in which said numbering device incorporates a signal control shaft driven step-by-step and bearing a control cam and a signalling drum cam, the said control cam rendering operative at certain of its positions signal levers which cooperate with the signal permutations formed on the said signalling drum cam and arranged to control the sending of definite signals such as the distinguishing letters of the transmitter in question and letter case and figure case signals.

6. A telegraph instrument according to claim 5, in which the said control cam is arranged in further positions to render operative sets of signal levers which co-operate respectively with signal perforations formed on signalling cam drums borne by numeral shafts corresponding to the digits of the serial numbers of the messages and driven through intermittent gearing from said control cam shaft, said signalling cam drums being arranged to control the sending of signals corresponding to the successive digits of the said serial numbers.

7. A telegraph instrument according to claim 6, in which the intermittent gearing connecting the control cam shaft and the numeral shafts, consists of a plurality of Geneva stop mechanisms, each having a ratio of ten to one.

8. A telegraph instrument for transmitting 5-unit telegraph signals operated by perforated tape comprising a 5-unit telegraph transmitter for sending traffic signals and a 5-unit signal transmitter arranged to transmit serial numbers allotted to the transmitted messages and comprising a numbering device driven in step by step fashion and arranged to send at each step, one of a series of 5-unit signals comprising signals distinctive of the transmitter followed by the digits of a serial number of the message in descending order, said numbering device including a signal control shaft driven step-by-step and bearing a control cam and a signalling drum cam, the said control cam rendering operative at certain of its positions signal levers which cooperate with the signal permutations formed on the said signalling drum cam and arranged to control the sending of definite signals, said control cam being arranged in further positions to render operative sets of signal levers which cooperate respectively with signal perforations formed on signalling cam drums borne by numeral shafts corresponding to the digits of the serial numbers of the messages and driven through intermittent gearing from said control cam shaft, said signalling cam drums being arranged to control the sending of signals corresponding to the successive digits of the said serial numbers, and said traffic transmitter and the numbering transmitter being operated from a continuously driven signalling cam shaft rotated at a speed of one revolution per character, which shaft bears a cam drum with which all the signalling levers cooperate and which is formed with cam faces along its length in helical formation which permit the five selecting levers of each set to select marking or spacing signals in succesion.

9. A telegraph instrument according to claim 8, in which all the signalling levers, when in operation, operate a common transmitting contact member which is operatively connected to a lever continuously operated at baud speed, and is actuated to the marking or spacing side in dependence upon one of the set of signal levers operative at any time and moved when freed by the signalling cam, assuming its marking or spacing position and accordingly causing a projection to impede the movement of said lever or to allow same to reciprocate without interference.

10. A telegraph instrument according to claim 9, in which the said bail is continuously reciprocated by means of a cam carried by the signalling cam shaft.

11. A telegraph instrument according to claim 8, in which said cam drum borne by said signalling cam shaft is formed with an additional cam face and said traffic transmitter comprises an additional pecker lever and a pecker affixed thereto in position to be actuated by the perforated tape, said additional pecker lever controlling an additional signal lever located to co-operate with said additional cam face so as to select marking signals continuously upon the perforated tape running out, thereby sending the stop signal.

12. A telegraph instrument according to claim 2, in which both the traffic transmitter and the numbering transmitter are operated from a continuously driven signalling cam shaft rotated at a speed of one revolution per character, said signal control shaft bears a ratchet wheel, the tape feed spindle of the traffic transmitter also bears a ratchet wheel, the said ratchet wheels being driven by pawls continuously reciprocated by cams on said signalling cam shaft both held out of action when a finger lever is in the "off" position but when said finger lever is released to the "send" position, the signal control pawl is brought into engagement with the signal control ratchet wheel so that the signal control shaft is thereupon turned by one step at each revolution of the signalling cam shaft, the tape feed pawl meantime being held out of action by a movable interposed piece while upon the signal control shaft completing its cycle, a cam carried by it causes the said interposed piece to withdraw the signal control pawl from action and to release the tape feed pawl which therefore feeds the tape by one step at each revolution of the signalling cam shaft.

13. A telegraph instrument according to claim 12, in which, when the finger lever is in the "off" position, said finger lever engages the tape feed pawl to hold same out of driving engagement and a hooked arm pivoted to the finger lever retains a pawl actuator so that said pawl actuator leaves said interposed piece in engagement with said signal control pawl to retain the latter out of driving engagement while on release of said finger lever, said hooked arm is moved to rock said pawl actuator thereby moving said interposed piece out of engagement with said signal control pawl to permit same to drive the signal control ratchet wheel and into engagement with said tape feed pawl which is thus still held out of driving engagement, said cam carried by the signal control shaft thereupon releasing a spring-controlled pivoted lever which retains said pawl actuator and thereby causes said interposed piece to continue to hold said tape feed pawl out of driving engagement, said cam carried by the signal control shaft next rocking a further spring-controlled pivoted lever to cause same to remove said hooked arm from engagement with said pawl actuator and on completion of the cycle of said signal control shaft, said cam carried by said signal control shaft actuates said first-named spring-controlled lever to cause same to release said pawl actuator, permitting said interposed piece to release said tape feed pawl into its driving position and to engage said signal control pawl and to retain same from further driving engagement.

14. A telegraph instrument according to claim 8, in which said cam borne by said signalling cam shaft is formed with a high portion preceding said signal cam faces and acting to retain all the selecting levers in the rearward position and thereby to select a spacing signal which constitutes the start signal.

15. A telegraph instrument according to claim 8, in which all the signalling levers, when in operation, operate a common transmitting contact member which is operatively connected to a lever continuously operated at baud speed, and is actuated to the marking or spacing side in dependence upon one of the set of signal levers operative at any time and moved when freed by the signalling cam, assuming its marking or spacing position and accordingly causing a projection to impede the movement of said lever or to allow same to reciprocate without interference, said projection is carried by a pivoted bail biassed rearwardly into contact with said signalling levers and moved forwardly upon any one of said signalling levers assuming its marking position, said projection thus attaining a position to impede the movement of said continuously operated lever and thereby to actuate said contact member or retain said contact member on the marking side.

16. A telegraph instrument according to claim 8, comprising a set of five pivoted members located to cooperate with respective cam faces of said cam drum on said signalling cam shaft, each of said pivoted members being formed with a transverse blade which co-operates with a group of five of said signalling levers each of which is a member of one of said sets so that each of said cam faces permits in turn the movement of one of said pivoted members and of the corresponding groups of signalling levers under the control of the perforated tape or of the cam drum borne by the signal control shaft or by a numeral shaft with which the respective signal lever co-operates.

17. A telegraph instrument for transmitting signals recorded on perforated tape according to the 5-unit code comprising a 5-unit telegraph tape transmitter including a set of selector levers and peckers carried by said selector levers for exploring the perforated paper tape; a serial-number signal transmitting device comprising a rotary control cam shaft and a plurality of numeral shafts driven from said control cam shaft, a plurality of signalling drum cams respectively carried by said control cam shaft and each of said numeral shafts, a plurality of sets of additional selector levers, the respective sets co-operating with said signalling drum cams, a control cam driven by said control cam shaft, a bail selectively shifted by said control cam and mounted to co-operate with and said selectively release each of said sets of selector levers and signal transmitting means controlled by the actuation of the selector levers of each of said sets; a driving shaft, clutch means adapted to connect said driving shaft alternatively to said telegraph tape transmitter and to said control cam shaft, manually operated means for actuating said clutch means to couple said driving shaft to said control cam shaft and means operatively connected with said control cam shaft to be actuated on completion of a cycle of said control cam shaft to uncouple said driving shaft from said control cam shaft and to couple said driving shaft to said tape telegraph transmitter.

18. A telegraph instrument according to claim 17, in which all of said selector levers comprise arms extending side-by-side in a parallel assembly with edges which are all coplanar, each of said edges being formed with a slot, the slots in each set of selector levers being in alignment but the slots of different sets being located at different points along said arms and said bail comprises a cross-bar extending from a pivoted arm transversely across the slotted edges of all of said arms while said control cam operates to shift said cross-bar along said arms into positions in dependence upon the angular position of said control cam shaft, said cross-bar in each of said positions registering with the slots of one of said sets of arms and accordingly permitting that corresponding set of selector levers to be released and to move angularly until said cross-bar lies in the slots of said set of arms.

19. A telegraph instrument according to claim 8, in which said continuously operated lever has three arms radiating from its pivot which is carried on a pivoted lever co-operating with a cam on the signalling cam shaft which cam rocks said pivoted lever and reciprocates said continuously operated lever once per signal element period, one of said arms being located to co-operate with said projection, a second arm engaging said contact member when said continuously operated lever has its movement impeded by said projection and the third arm actuating an additional pivoted lever when said continuously operated lever moves unimpeded by said projection, said additional pivoted lever being located to actuate said contact member in the opposite direction.

20. A telegraph instrument according to claim 8, and including a pivoted bail biased rearwardly into contact with said signalling levers and moved forwardly upon any one of said signalling levers assuming its marking position to impede the movement of said continuously operated lever, a pivoted lever shaped with a cam face located to engage said pivoted bail and to actuate said bail to the marking position when said lever is depressed, a finger button for manually depressing said lever, a return spring for said lever and a latch arm located to retain said lever in the depressed operative position to cause the marking condition or stop signal to be continuously sent by said transmitter.

21. A telegraph instrument according to claim 8, comprising a cam on said signal control shaft co-operating with said latch arm to release said pivoted lever to permit same to rise at the completion of a selection cycle when said finger button is released.

FRED WARBURTON.

REFERENCES CITED

The following references are of record in the file of this patent:

UNITED STATES PATENTS

| Number | Name | Date |
| --- | --- | --- |
| 2,193,809 | Dickes et al. | Mar. 19, 1940 |
| 2,193,812 | Blanton | Mar. 19, 1940 |
| 2,451,045 | Potts | Oct. 12, 1948 |